UNITED STATES PATENT OFFICE.

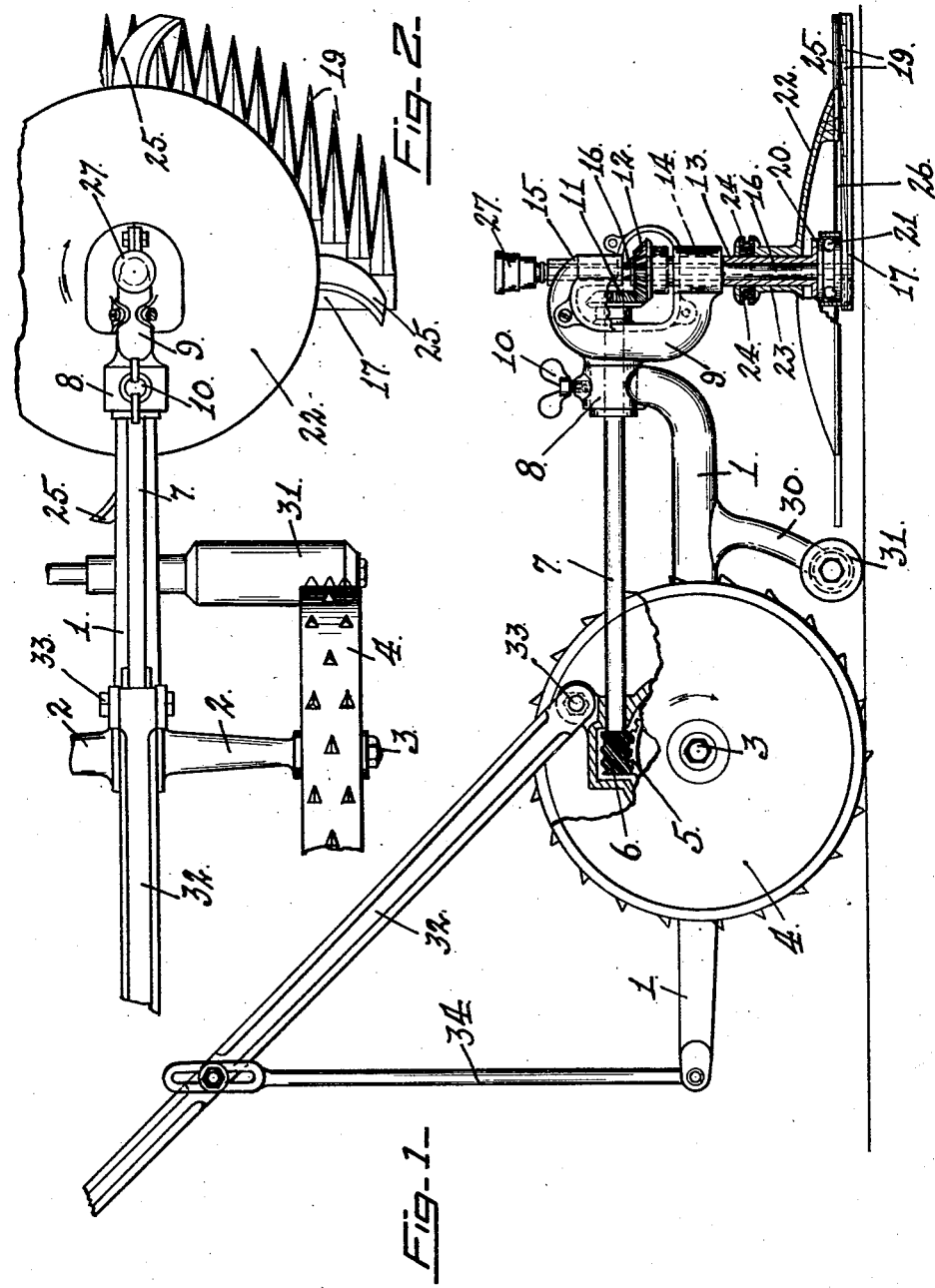

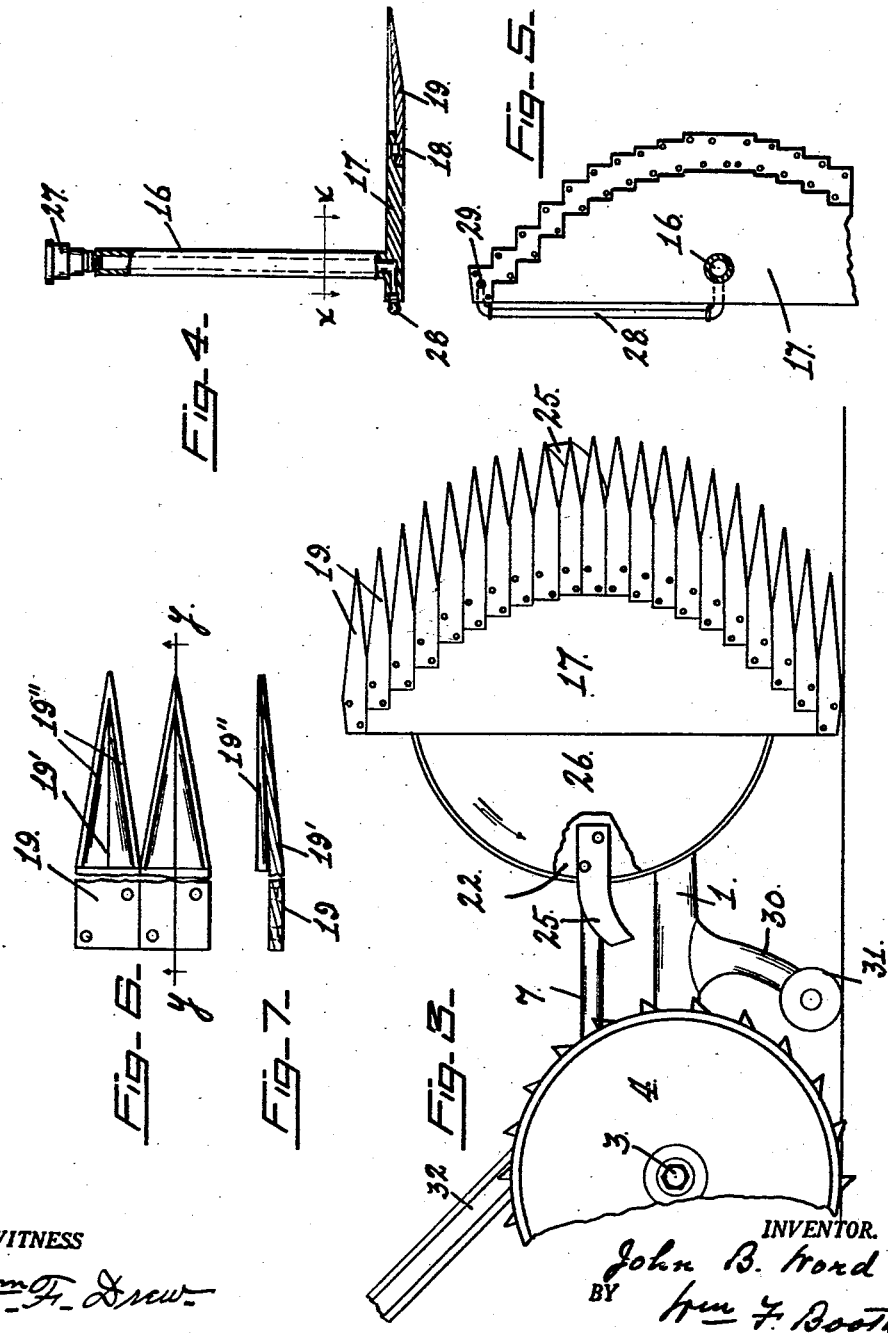

JOHN B. WORD, OF LATROBE, CALIFORNIA, ASSIGNOR OF TWO-THIRDS TO JAMES M. VOGELI, OF SACRAMENTO, CALIFORNIA.

LAWN-MOWER.

1,189,519.  Specification of Letters Patent.  Patented July 4, 1916.

Application filed October 25, 1915. Serial No. 57,739.

*To all whom it may concern:*

Be it known that I, JOHN B. WORD, a citizen of the United States, residing at Latrobe, in the county of Eldorado and State of California, have invented certain new and useful Improvements in Lawn-Mowers, of which the following is a specification.

My invention relates to the class of mowing machines, and more particularly to a machine for cutting or mowing grass or lawns.

The object of my invention is to provide a lawn mower by which the grass may be readily and successfully cut right up to and including the edge of the lawn, whether such edge be sloped off in the form of a bank, or bounded by a fence, wall, or curbing. This is impossible with mowers of the type commonly used, and the grass in such places must be cut by means of hand-operated shears, involving considerable additional labor and loss of time.

My device has other features and advantages, such as adjustability of the cutting members to operate in a horizontal plane, a vertical plane, or in any plane intermediate these two. It may thus be used on sloping banks, and on all kinds of surfaces and in various localities regardless of obstructing walls and boundaries. The machine has a provision also for regrinding the cutting edges; all as will be hereinafter more fully set forth.

My invention, therefore, consists in the novel lawn mower which I shall now fully describe, and in order to fully comprehend my invention and the manner in which I apply it in structural form, reference should be had to the accompanying sheets of drawings, in which—

Figure 1 is a part sectional elevation of my lawn-mower, showing the knife in position for cutting over a flat horizontal surface. Fig. 2 is a plan view of a portion of the machine. Fig. 3 is an elevation of the machine, showing the knife in vertical position for trimming the edge of a lawn. Fig. 4 is a part-sectional elevation of a detail of the stationary cutting member, and the stem for supporting the same. Fig. 5 is a detail plan view, taken in the direction of the arrows on the line *x—x* of Fig. 4, of the plate to which the stationary-knife blades are attached. Fig. 6 is a plan view of a pair of the stationary blades. Fig. 7 is a sectional elevation of the same taken on the line *y—y* of Fig. 6.

In the drawings, the numeral 1 represents the frame of the machine, upon which is mounted a transverse stationary tubular axle 2, Fig. 2. A live or rotating axle 3, journaled within said stationary axle, carries at its ends the symmetrically disposed traction wheels 4, only one of which is shown in the drawings, and at its center a spiral gear 5, Fig. 1, which meshes with a similar gear 6 on a forwardly extending rotatable shaft 7. The forward end of the frame 1 is up-turned, and is provided with a horizontal bearing 8, in which a bracket 9 is mounted for rotation in a vertical plane, and forming a swiveled journal connection. A set screw 10 in the bearing 8 clamps said bracket 9 in any desired position. The drive shaft 7 passes through the center of this swivel connection between the bracket 9 and the frame 1, and carries on its end a bevel gear 11, Fig. 1 of the drawings, which meshes with a similar gear 12 carried by the upper end of a sleeve 13, rotatably mounted within the bracket 9 at 14. Fastened in the upper arm 15 of the bracket 9 is a depending hollow stem 16, extending through and providing a bearing for the rotatable sleeve 13. Fixed to the lower end of said stem is a plate 17, Figs. 1, 3, 4 and 5, approximately semi-circular in shape. To the convex edge of this plate is secured, as by means of rivets 18, a series of teeth 19, the whole constituting a stationary knife or cutting member.

The sleeve 13 is provided at its lower end with a collar or flange 20, and a thrust bearing 21 is interposed between said flange and the plate 17. A cupped disk 22, having a hub 23, is carried by the sleeve 13, and fastened thereto by means of set screws 24. This disk 22 carries about its periphery a series of radially extending knife blades 25, herein shown as four in number, and said disk with its blades constitutes a rotatable knife or cutting member. The convex side of the disk 22 is upward, to better shed the grass and to prevent its accumulation. A shield 26 is provided on the underside of the disk 22, which shield in conjunction with the cupped disk effectually prevents grass and foreign matter from getting into the thrust bearing 21.

It will be seen that the disk 22, carrying the knife blades 25, may be set at such a point on the sleeve 13 that said knife blades will just clear the upper surfaces of the stationary teeth 19. In this position, as the machine is pushed forward, rotary motion is transmitted from the traction wheels 4 to the disk 22 through the gears 5 and 6, the shaft 7, the gears 11 and 12 and the sleeve 13, so that the grass is cut between the stationary teeth 19 and the revolving blades 25. Moreover, by rotating the bracket 9 within its socket 8, the associated cutting members may be set in any desired position, either horizontal, as in Figs. 1 and 2, or vertical, as in Fig. 3, or at any inclination therebetween, in order to properly operate on the edge of a slope, or to trim the edge of a lawn.

The stem 16 is hollow, as before stated, and is fitted at its upper end with a compression grease-cup 27, adapted to contain and to force downward through said hollow stem an abrasive material, preferably in the form of a paste. This abrasive material is led from the lower end of the stem 16 through a tube 28, Fig. 5, to an outlet 29 in the upper surface of the plate 17, and discharged therefrom in close proximity to the first of the series of stationary teeth 19. These teeth are formed as shown in Figs. 6 and 7, with a depressed center 19', and raised cutting edges 19''. The abrasive material, issuing from the discharge outlet 29, is distributed over the teeth 19 by the revolving knife blades 25, so that by the action thereof the raised edges 19'' of said teeth are sharpened. Obviously, this grinding operation may be done as often as necessary.

A downwardly extending bracket 30 of the frame 1, Figs. 1 and 3, carries a pair of freely rotatable rollers 31 (one only of which is shown in the drawings), which serve to steady and maintain the cutting mechanism at the proper distance from the ground. A suitably formed upwardly extending handle 32 is fastened to the frame 1 at 33 and braced by an adjustable rod 34, and is used to propel the machine.

I claim:—

1. A mower comprising a frame having a traction wheel; a fixed stem depending from the forward end of the frame; a stationary cutting member carried by said stem; a sleeve carried by the frame and revolubly fitted on the stem as an axis; a rotatable cutting member carried by the sleeve in cutting relation to the stationary cutting member, said rotatable member comprising a cupped disk having its convex side upward, a bottom shield for the disk, and knife-blades projecting from the periphery of the disk; an anti-friction thrust bearing between the lower end of the sleeve and the stationary cutting member, said bearing being housed within the cupped disk; and means to rotate the sleeve from the traction wheel.

2. A mower comprising a frame having a traction wheel; a fixed stem depending from the forward end of the frame; a stationary cutting member carried by said stem; a sleeve carried by the frame and revolubly fitted on the stem as an axis; a rotatable cutting member carried by the sleeve in cutting relation to the stationary cutting member, said rotatable member comprising a cupped disk having its convex side upward and provided with a hub fitted for vertical adjustment on the sleeve, a bottom shield for the disk, and knife-blades projecting from the periphery of the disk; set-screws in the disk hub bearing on the sleeve to fix the disk in the position adjusted whereby the cutting relation of the cutting members is varied; an anti-friction thrust bearing between the lower end of the sleeve and the stationary cutting member, said bearing being housed within the cupped disk; and means to rotate the sleeve from the traction wheel.

3. In a mower, the combination of a frame having a traction wheel; a fixed hollow stem carried by the frame; co-acting cutting members one rotatable about said stem as an axis and the other stationary and carried by said stem, the teeth of the stationary member having depressed centers and raised cutting edges; means for conveying abrasive material supplied to the hollow stem to said raised cutting edges; and means to drive the rotatable cutting member from the traction wheel.

4. A mower comprising a frame having a traction wheel; associated stationary and rotatable cutting members; a bracket horizontally journaled in the frame and carrying said associated cutting members adapting the latter for angular adjustment; and means to drive the rotatable member from the traction wheel.

5. A mower comprising a frame having a traction wheel; associated stationary and rotatable cutting members; a bracket horizontally journaled in the frame and carrying said associated cutting members adapting the latter for angular adjustment; means for fixing them in the plane to which they are adjusted; and means to drive the rotatable member from the traction wheel.

6. A mower comprising a frame having a traction wheel; a bracket having a bearing horizontally journaled at the forward end of the frame, adapting the bracket for angular adjustment; associated stationary and rotatable cutting members carried by said bracket; a shaft passing through the bearing of the bracket; power transmitting connections to drive the shaft from the traction wheel, and power transmitting connections to drive the rotatable cutting member from the shaft.

7. A mower comprising a frame having a traction wheel; a bracket having a bearing horizontally journaled at the forward end of the frame, adapting the bracket for angular adjustment; means for fixing said bracket in any angular position to which it may be turned on its journal; associated stationary and rotatable cutting members carried by said bracket; a shaft passing through the bearing of the bracket; power transmitting connections to drive the shaft from the traction wheel; and power transmitting connections to drive the rotatable cutting member from the shaft.

8. A mower comprising a frame having an axle and a traction wheel; a bracket having a bearing horizontally journaled at the forward end of the frame adapting the bracket for angular adjustment; a fixed stem depending from the bracket; a stationary cutting member carried by the stem at its lower end; a sleeve revolubly carried in said bracket about the fixed stem as an axis; a rotatable cutting member carried by the sleeve in cutting relation to the stationary member; a shaft passing through the bearing of the bracket; gearing between the axle and one end of the shaft and gearing between the other end of the shaft and the sleeve.

In testimony whereof I have signed my name to this specification in the presence of two subscribing witnesses.

JOHN B. WORD.

Witnesses:
   CHAS. H. CROCKER,
   N. L. FISHER.